United States Patent Office 2,875,158
Patented Feb. 24, 1959

2,875,158
HYDROGENATION CATALYST

Leon O. Winstrom, East Aurora, N. Y., assignor to Allied Chemical Corporation, a corporation of New York No Drawing. Original application December 29, 1950, Serial No. 203,561, now Patent No. 2,716,135, dated August 23, 1955. Divided and this application August 18, 1955, Serial No. 529,311

18 Claims. (Cl. 252—439)

This invention relates to a hydrogenation catalyst and is particularly concerned with an improved catalyst of the type employed for the vapor phase hydrogenation of nitrobenzene to aniline.

The prior art discloses the hydrogenation of nitrobenzene vapors to aniline in the presence of catalysts comprising nickel sulfide supported on inactive alumina, e. g. corundum and "Alundum." However, experience indicates that such catalysts have comparatively low activity and are generally inadequate for commercial use in the hydrogenation of aromatic nitro compounds to the corresponding amines. The art further discloses hydrogenation of nitrobenzene to aniline in the presence of a catalyst consisting of a mixture of metallic sulfides, such as nickel sulfide and tungsten sulfide, supported on activated alumina, and the vapor phase hydrogenation of nitrobenzene to aniline over a catalyst consisting of copper sulfide supported on an inert carrier including activated alumina. However, in commercial practice as heretofore carried out, aniline is commonly prepared from nitrobenzene using acid and iron as reducing medium.

One object of the invention is to provide an improved hydrogenation catalyst. A particular object of the invention is the provision of an improved catalyst for hydrogenating nitrobenzene in the vapor phase to aniline. Other objects of the invention will in part be obvious and will in part appear hereinafter.

To accomplish the foregoing objects and in a broad sense, the invention briefly resides in the provision of improved hydrogenation catalysts of the type comprising essentially nickel sulfide associated with amorphous alumina prepared in the manner hereinafter described. The use of the nickel sulfide-amorphous alumina catalysts of the invention in hydrogenation reactions, and especially in the reduction of aromatic nitro compounds by hydrogenation, greatly increases the rate of reaction and the yield of product, particularly aromatic amine product, over that obtained utilizing the ordinary nickel sulfide-alumina catalysts heretofore proposed for this reaction, especially as regards production of aniline from nitrobenzene. Thus, my catalysts may be as much as 100 times as effective as prior art catalysts, particularly those made with inactive alumina, which have been proposed for aiding the hydrogenation of aromatic compounds such as nitrobenzene to the corresponding amines.

In the broad aspect, the catalysts of the present invention comprise essentially a mixture of nickel sulfide and amorphous alumina which has been obtained by a sulfiding treatment from a material comprising essentially a hydrated nickel aluminate. Advantageously, the hydrated nickel aluminate is produced by forming a mixture of precipitated insoluble compounds of nickel and aluminum selected from the group consisting of their hydroxides and carbonates, and heating the mixture of precipitated insoluble compounds in the presence of water for a period sufficient to produce a substantial proportion of hydrated nickel aluminate. In a preferred embodiment, the catalysts of the present invention are derived from a coprecipitate of nickel and aluminum hydroxides and/or carbonates, obtained by reacting ammonium carbonate with an aqueous solution of water-soluble nickel and aluminum salts, by heating the coprecipitate to a temperature of about 90° to 100° C. in the presence of water.

The amorphous alumina, which constitutes an essential element of the catalyst of the invention, does not function merely as a carrier or inert material in the catalyst composition, but acts as a promoter for the nickel sulfide. Hence, the combination of the nickey sulfide and amorphous alumina in the catalyst of the invention acts synergistically to facilitate hydrogenation reactions to a degree far above the additive individual effects of the nickel sulfide and the amorphous alumina on the reactions.

Catalysts of the present invention, comprising amorphous alumina in combination with nickel sulfide, may be prepared in various ways a number of which are suitable. Broadly, they comprise the conversion of a hydrated nickel aluminate to a mixture of nickel sulfide and amorphous alumina by a sulfiding treatment, preferably with an intermediate heating treatment to form a mixture of nickel oxide and amorphous alumina. If desired the nickel oxide can be reduced to metallic nickel in known manner prior to the sulfiding treatment. One method of making the so-called "precipitated" type catalyst involves forming a mixture of gelatinous precipitates of nickel and aluminum hydroxides and/or carbonates, heating the mixture of precipitates with water to form hydrated nickel aluminate, and sulfiding, in a manner described more fully below. A particularly valuable form of nickel sulfide-amorphous alumina catalyst of the "precipitated" type is the so-called "coprecipitated" type catalysts obtained by coprecipitating nickel and aluminum in the form of a member of the group consisting of (1) nickel and aluminum hydroxides, (2) nickel and aluminum carbonates, and (3) nickel and aluminum hydroxides and carbonates, heating the resulting gel product in the presence of water to convert a substantial proportion of the gel product to hydrated nickel aluminate, and subsequently sulfiding.

The hydrated nickel aluminate may be converted to a catalyst in various ways in accordance with the present invention. Thus, the hydrated nickel aluminate, or the "green" catalyst obtained, for example, by commingling or coprecipitating gels of aluminum and nickel hydroxides and/or carbonates followed by conversion to the hydrated nickel aluminate form, may be transformed to the sulfide catalyst, for example, by heating directly with a sulfiding agent (e. g., in an atmosphere of hydrogen sulfide, carbon bisulfide, etc.), preferably between about 300° and 500° C.

In the preferred production of a catalyst in accordance with the present invention, the hydrated nickel aluminate is heated (ignited) to form a mixture of nickel oxide and amorphous alumina, and the latter mixture is treated with a sulfiding agent (e. g. hydrogen sulfide, carbon bisulfide, etc.), preferably between about 300° and 500° C., to form nickel sulfide. The heating (igniting) and sulfiding operations may be conducted simultaneously, if desired; or, prior to the sulfiding step, the mixture of oxides can be subjected to reduction with hydrogen in known manner to convert the nickel oxide to metallic nickel, which then can be sulfided. The heating (igniting), sulfiding, etc., operations are generally conducted at a temperature not above 800° C., and preferably not above about 500° C.

In a preferred embodiment of the invention for securing a nickel sulfide-alumina type catalyst of unusual value, the gel formed by separately precipitating and commingling nickel and aluminum hydroxides and/or carbonates, or by coprecipitating such hydroxides and/or carbonates, is heated, say at about 90–100° C., in the presence of water. This procedure yields a material which, according to X-ray analysis, comprises a substantial proportion of a hydrated nickel aluminate such as $Ni_2Al_2O_5 \cdot xH_2O$ (see Comptes Rendus, vol. 226 (1948), pages 579–580). When such a nickel aluminate is sulfided, e. g. at elevated temperatures with $H_2S$, a catalyst comprising a mixture of nickel sulfides and amorphous alumina in accordance with the invention, is formed, which catalyst is distinguished by excellent activity and selectivity combined with exceptional longevity when employed in hydrogenation reactions, and particularly in the reduction of nitrobenzene to aniline by hydrogenation.

It is to be understood, however, that the invention includes nickel sulfide-amorphous alumina catalysts obtained by sulfiding a material comprising essentially a hydrated nickel aluminate prepared in any suitable manner. While the basis of the superiority of the catalyst derived from hydrated nickel aluminate is not known, it is believed that the improved result is due to a superior lattice spacing of nickel and aluminum atoms in the catalyst.

The "precipitated" type catalysts, obtained by commingling separately prepared gels (gelatinous precipitates) of nickel and aluminum hydroxides and/or carbonates, or by coprecipitating a mixture of these compounds, followed by hydrating such mixed gels or coprecipitates to form hydrated nickel aluminate, heating, and sulfiding, are particularly valuable for promoting hydrogenation of nitrobenzene vapors to aniline, and hence are preferred for such hydrogenation.

A suitable mixture of precipitates of insoluble compounds of nickel and aluminum may be obtained by commingling precipitates (gels) of aluminum hydroxide and/or carbonate and nickel hydroxide and/or carbonate obtained by alkaline precipitation from water-soluble nickel and aluminum salts (e. g., of hydrochloric, sulfuric, nitric, formic, acetic, etc. acids), for example, by reaction with a suitable alkaline agent (e. g., ammonium and alkali metal hydroxides and carbonates) in aqueous solution.

Preferred catalysts in accordance with the invention are obtained from the mixture of precipitates (coprecipitates) of nickel and aluminum hydroxides and/or carbonates (gels) resulting from alkaline coprecipitation from a mixture of water-soluble salts of nickel and aluminum. A suitable coprecipitate may be obtained by treating an aqueous solution containing a mixture of water-soluble aluminum and nickel salts (e. g. of hydrochloric, sulfuric, nitric, formic, acetic, etc. acids) with a suitable alkaline agent (e. g. ammonium and alkali metal hydroxides and carbonates) especially ammonium carbonate. Another procedure involves adding a nickel salt (e. g. nickel nitrate) to aqueous sodium aluminate. The coprecipitate secured by these procedures is preferably washed and dried, and the dried product ("green" catalyst) converted to suitable size and shape, followed by heating and sulfiding to produce the catalyst.

The amorphous alumina is effective, in amounts varying over a wide range, as promoter for the nickel sulfide in hydrogenation reactions, e. g. in the hydrogenation of nitrobenzene to aniline. Thus, the promoting action may be realized even if such alumina is present in amount as low as 2% by weight of the catalyst mixture of amorphous alumina and nickel sulfide. However, it is preferable to employ the amorphous alumina promoter in an amount of at least 10% by weight of the nickel sulfide-amorphous alumina catalyst; and for best results, particularly in the case of the "precipitated" type catalysts hereof, from about 10% to about 90% of the amorphous alumina by weight of the catalyst composition should be present. An especially valuable catalyst contains nickel and aluminum in substantially equimolar amounts (atomic proportions).

The nickel sulfide-amorphous alumina catalysts of the invention require no addition of $H_2S$ or other sulfiding agent during the hydrogenation of nitrobenzene to aniline to maintain their activity, and are generally characterized by high activity and long life when used in this reaction. Further, their activity, when lost, may be restored substantially completely and repeatedly by removing accumulated organic material therefrom by oxidation with oxygen or air preferably at between 300° and 500° C., followed by reduction with hydrogen preferably within the same temperature range, as described and claimed in U. S. Patent 2,671,763 to L. O. Winstrom and W. B. Harris.

The alumina is apparently present essentially entirely in amorphous form in the catalysts of the present invention. Ordinary aluminas, on the other hand, are of essentially crystalline structure and do not possess the physical characteristics and catalytic activity of the amorphous alumina of the invention catalyst. The expression "amorphous alumina" as employed herein is intended to denote alumina which is substantially completely in amorphous form.

Further, the nickel sulfide-amorphous alumina type catalysts of the present invention are believed to contain the sulfur and nickel mainly in the form of a mixture of sulfides and apparently do not lose substantial amounts of sulfur during use and/or reactivation, whereas the prior art catalysts employed in hydrogenating nitrobenzene to aniline, obtained by sulfiding nickel oxide supported on inactive alumina in the form of corundum or "Alundum" and apparently containing only one nickel sulfide (i. e. NiS), tend to lose all of their sulfur content and are markedly less active than the catalysts of the invention.

It is accordingly believed that the relatively high activity as hydrogenation catalysts of the nickel sulfide-amorphous alumina catalysts of the invention is due to their content of amorphous alumina and/or multiple nickel sulfides, wherein the nickel is present in various valences. However, the invention is not to be taken as limited by any theory as to the reason for, or the manner in which, the catalysts hereof successfully function.

The above described catalysts derived from a hydrated nickel aluminate, containing nickel sulfide intimately mixed with amorphous alumina, are much more highly active hydrogenation catalysts than catalysts prepared by coating nickle sulfide on a carrier of ordinary alpha alumina (e. g. corundum, "Alundum"), pumice, etc. In addition, they possess longer catalyst life and greater activity in the hydrogenation reaction (for example, they permit a faster rate of hydrogenation and catalyze the hydrogenation reaction more vigorously at given temperatures) than nickel sulfide catalysts supported on activated alumina.

The invention will be illustrated by the following specific example, but it is to be understood that it is not limited to the details thereof and that changes may be made without departing from the scope of the invention. The temperatures are in degrees centigrade and the parts are by weight.

Example

A filtered solution of 430 parts of ammonium carbonate $((NH_4)_2CO_3 \cdot H_2O)$ in 2550 parts of distilled water at 5° was added gradually with rapid agitation to a filtered solution at 5° prepared by mixing a solution of 291 parts of nickel nitrate $(Ni(NO_3)_2 \cdot 6H_2O)$ in 300 parts of distilled water with a solution of 375 parts of aluminum nitrate $(Al(NO_3)_3 \cdot 9H_2O)$ in 350 parts of distilled water. The slurry thus obtained was filtered, and the filter cake was washed three times by resludging it each time with 4 times its volume of distilled water and filtering. The washed cake was resludged with 4 times its volume of distilled water, and the aqueous mixture was heated to 100° for about 18 hours, and filtered. The cake was dried in an atmospheric oven and crushed to size, yielding a total of 190 parts of product comprising 63 parts of 6–8 mesh size, 29 parts of 8–10 mesh size and 51 parts of 10–100 mesh size.

79 parts of "green" catalyst thus obtained (64 parts of 6–8 mesh size and 15 parts 8–10 mesh size) were placed in an igniter and heated in a stream of air first to 300° in 1 hour, then to 450° in 2 additional hours and held at 450° for 1 additional hour. The catalyst was then cooled to room temperature and sulfided by heating in a stream of hydrogen sulfide, first to 300° in one hour and then to 450° in one hour, maintaining the catalyst at 450° C. for 1 hour, and then cooling to room temperature. About 60 parts of catalyst were thus obtained and stored in an atmosphere of carbon dioxide prior to use.

This catalyst was charged to a Downs type converter (see for example U. S. P. 1,604,739). Technical nitrobenzene vapors admixed with about 9 molecular proportions of hydrogen (about 3 times the amount of hydrogen required by theory to form aniline) were passed through the catalyst bed prepared above with the bath temperature at 300° and at an hourly rate of about 300 grams of nitrobenzene per liter of catalyst. The yield of aniline thus obtained was almost quantitative. The catalyst was operated 1600 hours under the foregoing conditions without showing any substantial decline in activity.

The nickel sulfide-amorphous alumina catalysts of the invention may be utilized in admixture with other suitable materials which may be catalytic or non-catalytic under the reaction conditions. Thus, the catalysts of the invention, in the form of pellets, granules or other shapes, may contain binders, stabilizers, activators, or other components. Further, such catalysts may be used on supporting material or carriers such as silica or various clays, particularly where the amorphous alumina of the invention catalysts does not function itself as a carrier. Thus, for example, a suitable "co-precipitated" type catalyst may be prepared by forming the co-precipitates of nickel and of aluminum hydroxides in or on a suitable carrier, e. g. activated alumina, corundum, charcoal, etc., followed by hydrating and sulfiding as described above. In use, the catalyst compositions of the invention may be employed in the form of fixed catalyst beds or fluidized catalyst masses in a manner known in the art.

The nickel sulfide-amorphous alumina catalysts described above may contain small amounts of other metal sulfides in addition to nickel sulfide, e. g. copper sulfide, without deleteriously affecting the life or activity of such catalysts in operation.

The catalysts used in accordance with the invention are more of less pyrophoric, and are hence desirably kept and stored in a nonoxidizing atmosphere or medium (e. g., $CO_2$, $H_2$, $N_2$, $H_2S$) or under liquid aniline saturated with $H_2S$ or water saturated with $H_2S$.

From the foregoing, it is apparent that the nickel sulfide-amorphous alumina catalysts of the invention are much more powerful catalysts than catalysts prepared by combining nickel sulfide with inactive alumina, e. g. corundum or "Alundum."

While they are applicable for effecting the vapor phase and even liquid phase hydrogenations, they are of particular advantage in effecting the vapor phase hydrogenation of aromatic nitro compounds such as nitrotoluenes, nitroxylenes, etc. to the corresponding amines, and especially of nitrobenzene to aniline. Their major advantages when employed for the hydrogenation, and especially for hydrogenating aromatic nitro compounds, particularly nitrobenzene to aniline, are (a) great increase in rate of reaction; (b) ability to carry out the reaction more vigorously at a given temperature than heretofore possible by prior art procedures; (c) increase in yield of product; (d) longer catalyst life; and (e) ease of regeneration of the catalyst and ability to regenerate it repeatedly without discarding it, advantages (d) and (e) thus affording economies in catalyst cost and maintenance.

Since various changes and modifications may be made in the invention without departing from the spirit thereof, the invention is to be taken as limited only by the scope of the appended claims.

This application is a division of my application Serial No. 203,561, filed December 29, 1950 (now U. S. Patent 2,716,135).

I claim:

1. A method of producing a nickel sulfide-amorphous alumina catalyst suitable for effecting catalytic hydrogenation reactions, which comprises precipitating insoluble nickel and aluminum compounds selected from the group consisting of nickel and aluminum hydroxides and carbonates by alkaline precipitation of water-soluble nickel and aluminum salts, heating a mixture of the precipitates of insoluble nickel and aluminum compounds in the presence of water for a period sufficient to produce a substantial proportion of a hydrated nickel aluminate, and converting the resulting product to a mixture of nickel sulfide and amorphous alumina by a process including heating to a temperature not exceeding 800° C. and sulfiding.

2. A nickel sulfide-amorphous alumina catalyst suitable for effecting catalytic hydrogenation reactions, said catalyst essentially comprising an intimate mixture of nickel sulfide and amorphous alumina, the amount of alumina being at least 10% of the weight of the nickel sulfide-amorphous alumina catalyst, and having been obtained by the process of claim 1.

3. A method of producing a nickel sulfide-amorphous alumina catalyst as claimed in claim 1, which comprises forming a coprecipitate of insoluble nickel and aluminum compounds by reacting ammonium carbonate with an aqueous solution of water-soluble nickel and aluminum salts, and heating the coprecipitate to a temperature of about 90° to 100° C. in the presence of water for a period sufficient to produce a substantial proportion of hydrated nickel aluminate.

4. A method of producing a nickel sulfide-amorphous alumina catalyst as claimed in claim 1, which comprises forming a coprecipitate of insoluble nickel and aluminum compounds by reacting ammonium carbonate with an aqueous solution of water-soluble nickel and aluminum salts, heating the resulting coprecipitate to a temperature of about 90° to 100° C. in the presence of water, and heating the resulting product to a temperature not exceeding 500° C. prior to the sulfiding treatment.

5. A catalyst suitable for effecting hydrogenation reactions, comprising essentially an intimate mixture of nickel sulfide and amorphous alumina, the amount of alumina being about 10% to about 90% of the weight of the catalyst, said catalyst having been obtained by the process of claim 4.

6. A catalyst as defined in claim 5, wherein nickel and aluminum are present in the catalyst in substantially equiatomic proportions.

7. A method of producing a catalyst suitable for effecting catalytic hydrogenation reactions, which comprises converting a material comprising essentially a hydrated nickel aluminate to a product comprising essentially a mixture of nickel sulfide and amorphous alumina by a process including heating to a temperature not exceeding 800° C. and sulfiding.

8. A nickel sulfide-amorphous alumina catalyst suitable for effecting catalytic hydrogenation reactions, obtained by the process of claim 7.

9. A method of producing a nickel sulfide-amorphous alumina catalyst as defined in claim 7, wherein the hydrated nickel aluminate is produced by forming a mixture of precipitated insoluble compounds of nickel and aluminum selected from the group consisting of their hydroxides and carbonates, and heating said mixture of precipitated insoluble compounds in the presence of water for a period sufficient to produce a substantial proportion of a hydrated nickel aluminate.

10. A method of producing a nickel sulfide-amorphous alumina catalyst as defined in claim 9, wherein the hydrated nickel aluminate is obtained by coprecipitating nickel and aluminum in the form of a member of the group consisting of (1) nickel and aluminum hydroxides, (2) nickel and aluminum carbonates, and (3) nickel and aluminum hydroxides and carbonates, and heating the resulting gel product in the presence of water to convert a substantial proportion of the gel product to hydrated nickel aluminate.

11. A method of producing a nickel sulfide-amorphus alumina catalyst as defined in claim 10, wherein the mixture of precipitates of insoluble compounds is produced by reacting water-soluble nickel and aluminum salts in aqueous solution with an alkaline reagent selected from the group consisting of ammonium and alkali metal hydroxides and carbonates.

12. A method of producing a nickel sulfide-amorphous alumina catalyst as defined in claim 10, wherein the mixture of precipitates of insoluble compounds is heated at about 90° to 100° C. in the presence of water to obtain a substantial proportion of hydrated nickel aluminate, prior to the sulfiding treatment.

13. A method of producing a catalyst suitable for effecting catalytic hydrogenation reactions, which comprises heating with a sulfiding agent at a temperature not exceeding 800° C. a member of the group consisting of (1) a material comprising essentially a hydrated nickel aluminate, (2) a mixture of nickel oxide and amorphous alumina which has been produced by heating a hydrated nickel aluminate at a temperature not exceeding 800° C., and (3) a mixture of nickel and amorphous alumina which has been produced by heating a hydrated nickel aluminate at a temperature not exceeding 800° C. to form a mixture of nickel oxide and amorphous alumina and reducing the nickel oxide to nickel with hydrogen at a temperature not exceeding 800° C., whereby a mixture containing nickel sulfide and amorphous alumina is obtained.

14. A method of producing a catalyst suitable for effecting catalytic hydrogenation reactions as defined in claim 13, wherein the temperatures specified do not exceed 500° C.

15. A method of producing a catalyst comprising essentially an intimate mixture of nickel sulfides and amorphous alumina, the amount of alumina being about 10% to about 90% of the weight of the catalyst, which comprises heating a sulfiding agent, at a temperature not exceeding 500° C., with a mixture of oxides of nickel and aluminum which has been produced by igniting a hydrated nickel aluminate at a temperature not exceeding 500° C.

16. A method of producing a nickel sulfide-amorphous alumina catalyst as defined in claim 15, wherein the hydrated nickel aluminate is obtained by reacting ammonium carbonate with an aqueous solution of water-soluble nickel and aluminum salts to form a coprecipitate of insoluble nickel and aluminum compounds, and heating the coprecipitate in the presence of water.

17. A method of producing a nickel sulfide-amorphous alumina catalyst as defined in claim 16, wherein the coprecipitate is heated to a temperature of about 90° to 100° C. in the presence of water for a period sufficient to produce a substantial proportion of hydrated nickel aluminate.

18. A nickel sulfide-amorphous alumina catalyst suitable for effecting catalytic hydrogenation reactions, said catalyst comprising essentially an intimate mixture of nickel sulfide and amorphous alumina, the amount of alumina being at least 10% of the weight of the nickel sulfide-amorphous alumina catalyst, and having been obtained by a process which comprises forming a coprecipitate of insoluble nickel and aluminum compounds by reacting ammonium carbonate with an aqueous solution of water-soluble nickel and aluminum salts, heating the coprecipitate to a temperature of about 90° to 100° C. in the presence of water for a period sufficient to produce a substantial proportion of hydrated nickel aluminate, and converting the resulting product to a mixture of nickel sulfide and amorphous alumina by a process including heating to a temperature not exceeding 800° C. and sulfiding.

References Cited in the file of this patent

UNITED STATES PATENTS

| | | |
|---|---|---|
| 1,932,369 | Gathke | Oct. 24, 1933 |
| 2,038,566 | Huettner et al. | Apr. 28, 1936 |
| 2,151,329 | Page et al. | Mar. 21, 1939 |
| 2,559,457 | Montgomery et al. | July 3, 1951 |

OTHER REFERENCES

Mellor's "Comprehensive Inorganic and Theoretical Chemistry," New York (1923), page 439.